United States Patent Office 3,236,982
Patented Feb. 22, 1966

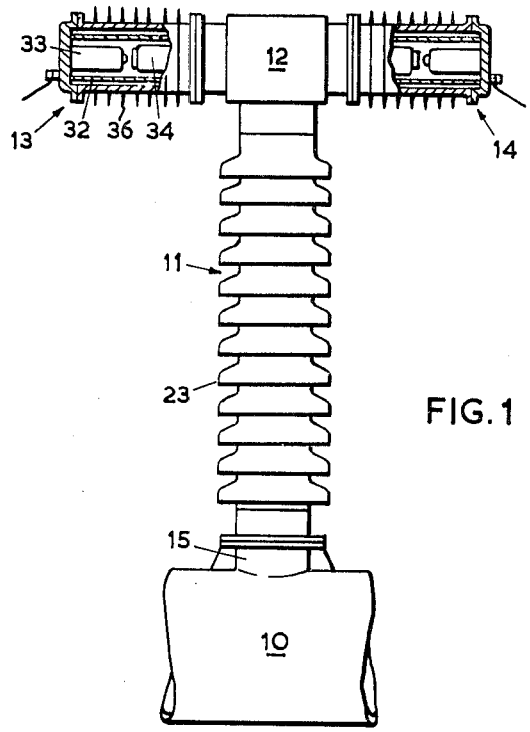
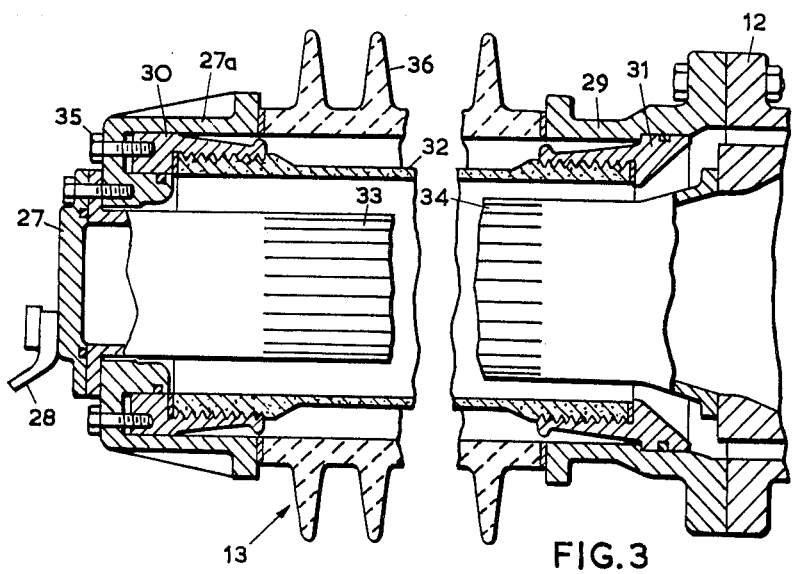

3,236,982
ELECTRIC SWITCHGEAR INCLUDING INSULATOR MEMBER CAPABLE OF WITHSTANDING TENSION
Stanislaw Mieczyslaw Gonek, Henry Rowlinson, James Fawbert Readman, James Alan Lockley, and Alexander Cattanach Kidd, Stafford, England, assignors to The English Electric Company Limited, London, England, a British company
Filed Mar. 14, 1962, Ser. No. 179,752
Claims priority, application Great Britain, Mar. 22, 1961, 10,483/61
2 Claims. (Cl. 200—148)

This invention relates to electric switchgear.

According to this invention electric switchgear apparatus comprises a hollow insulator including one or more ceramic insulating members placed in compression between end members by means of a hollow insulating member in tension. Preferably the ceramic member and the tension member are of circular section and the tension member is concentric with and within the ceramic member.

According to a feature of the invention said tension member is of resin-bonded fibrous material.

According to another feature of the invention the tension member may be screwed and bonded to metal end rings.

According to another feature of the invention the tension member may be secured to end rings by means of tapered fingers on an end ring which fit over the end of the tension member and are deformed into contact with it by a surrounding ring member. In this construction the end of the tension member is preferably internally reinforced by an inner ring.

According to yet another feature of the invention, where the tension member is of resin-bonded fibrous material and surrounds the contact members of a circuit interrupter, there is also provided a ring of inorganic heat-resisting insulating material within the tension member in the region of said contacts to protect said tension member from the effects of arcing between the contacts. This ring may be formed in one piece or may, for example, be formed in a number of segments.

One embodiment of switchgear incorporating the invention will now be described by way of example with reference to the accompanying drawings, of which:

FIG. 1 shows a diagrammatic view of electric switchgear apparatus;

FIG. 3 shows a different arrangement of end fittings for an insulating column.

Referring to FIG. 1, the electric switchgear apparatus comprises an air receiver 10 on which is mounted a hollow support insulator shown generally at 11. The latter carries a top cap 12, on each side of which is mounted a circuit interrupter assembly 13, 14.

Figure 2:
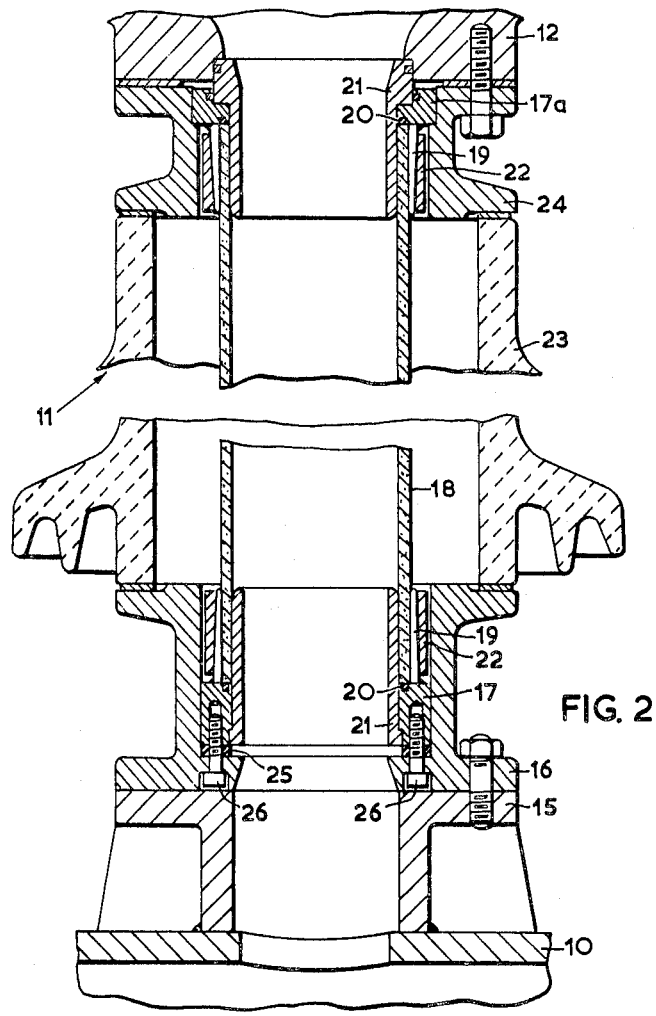
FIG. 2 shows in greater detail the end fittings of an insulating column.

The support insulator is mounted on the air receiver 10 by means of a flanged adaptor 15 (FIG. 2) welded to the receiver to which is bolted a flanged annular metal conduit 16.

Metal rings 17, 17a are secured to each end of a resin-bonded glass-fibre tube 18; each of the rings 17, 17a, which are preferably of steel, has axially-extending tapered spring fingers 19, which are forced over the outside of the end portion of the tube 18. A groove 20 is formed in an axially-facing portion of the ring 17 or 17a to receive a rubber or similar sealing ring which seals with the resin-bonded tube 18 when the latter is forced home within the spring fingers 19. A reinforcing ring 21 is placed within the end of the resin-bonded tube 18, this ring having a flanged engagement with the ring 17 or 17a: it is also preferably of steel. A clamping ring 22 of tapered cross-section is placed over the spring fingers 19 and forced axially over them, thereby deforming the fingers 19 inward to grip the resin-bonded tube 18.

The tube 18 forms the inner of two concentric circular-section insulating walls of the support insulator 11, the outer wall being formed by an insulating member 23 of porcelain or other ceramic, or by a number of such insulating members in end-to-end abutment, which is (or are) placed in compression between a flanged metal end ring 24, which engages with ring 17a, and the flanged conduit 16, within which the ring 17 is secured, by means of the hollow tube 18 in tension.

The degree of compression is determined by the tension applied to the tube 18; this is determined by the thickness of shims 25 between the end face of ring 17 and a corresponding face on conduit 16, these end faces being clamped solidly against the shims by means of set-screws 26.

Secured to the metal ring 24 at the head of the support insulator column is the top cap 12, which forms the central casing for the pair of circuit interrupter assemblies 13, 14.

Each of these interrupter assemblies comprises an endplate structure 27, 27a (FIG. 3), to which the line terminal 28 is attached, and an end ring 29 bolted to the top cap 12 and spaced from the endplate structure by a hollow insulator. Secured within the endplate structure 27, 27a and the end ring 29 respectively are a pair of metal rings 30, 31. The hollow insulator includes a resin bonded glass-fibre tube 32, to the ends of which are screwed and bonded (e.g. by epoxy resin material) the pair of metal rings 30, 31. The hollow, circular-section member 32 surrounds the contact members 33, 34 of the circuit interrupter 13, and means are provided for placing it in tension, including tensioning screws 35 which extend through the endplate member 27a. The hollow insulator also includes a hollow circular-section insulating member 36 of porcelain or other ceramic positioned between a flange on the endplate member 27a and a corresponding flange on the end ring 29. The insulating member 36 is concentric with and outside the tube 32, and is placed in compression between the flanges as a result of the tension in the resin-bonded tube 32. The tension in the glass-fibre tube 32 and its diameter will vary according to the size and application of the insulator. The tension would normally be in tens of tons for circuit-breaker applications, with high factors of safety.

Figure 4:
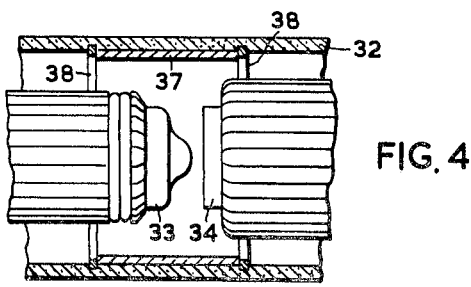
FIG. 4 shows a further detail of an insulating column.

In the region of the interrupter contacts 33, 34 the resin-bonded glass fibre tube 32 is provided with a liner 37 (FIG. 4) of an inorganic heat-resisting insulating material which may, for example, be of fused glass and mica, such as that sold under the name Mycalex (registered trademark), porcelain, alumina, fused quartz or certain types of opaque heat-resisting glass. The liner 37 may be formed in one piece and inserted within the tube 32, being retained in position by spring rings 38 of resin-bonded fibrous material engaging in grooves 39 in the bore of the tube 32, thereby preventing endwise movement of the liner, or alternatively it may be formed in a number of interlocking segments. It will be appreciated that the liner 37 may be a loose fit within the tube 32 and will protect the tube against excessive heating as a result of arcing between the interrupter contacts.

A hollow insulator having a ceramic insulating member in compression similar to member 23 and a hollow insulating member in tension similar to member 18 may, clearly, be employed in the interrupter assembly, and in this case the member 18 may be provided with a liner such as the liner 37.

In operation, gas under high pressure will be confined within the resin-bonded tubes 18, 32, the annular spaces between these tubes and the ceramic insulators 23, 36 being at a relatively low pressure. Control rods may conveniently be led through these annular spaces.

The tubes 18, 32 may be of any suitable resin-impregnated reinforced construction, such as of epoxy-resin-reinforced or polyester-resin-impregnated glass-fibre construction.

What we claim as our invention and desire to secure by Letters Patent is:

1. Gas-blast electric switchgear comprising first and second end members, an elongated hollow circular-section porcelain insulating member between said first and second end members, whereby to space said first and second end members apart, a cylindrical resin-bonded glass-fibre-reinforced insulating member concentrically within said elongated hollow circular-section porcelain insulating member and interconnecting said first and second end members in tension, whereby said elongated hollow circular-section porcelain insulating member is placed in compression, said elongated hollow circular-section porcelain insulating member and said cylindrical resin-bonded glass-fibre-reinforced insulating member defining a circular annular space therebetween, a pair of cooperating interrupter contact members within said cylindrical resin-bonded glass-fibre-reinforced insulating member, means to supply gas under high pressure to within said cylindrical resin-bonded glass-fibre-reinforced insulating member, said circular annular space being at a relatively low pressure, whereby the major part of the pressure difference between said high pressure and atmosphere occurs across said cylindrical resin-bonded glass-fibre-reinforced insulating member, and a liner of inorganic heat-resisting insulating material secured within the cylindrical resin-bonded glass-fibre-reinforced insulating member and surrounding the cooperating interrupter contact members, whereby to protect said resin-bonded glass-fibre-reinforced insulating member from the effects of an arc drawn between said contact members on operation of the circuit-breaker, tapered fingers formed on said first and second end members and fitting over the ends of said cylindrical resin-bonded glass-fibre-reinforced insulating member, and ring means surrounding said tapered fingers and deforming them to grip said cylindrical resin-bonded glass-fibre-reinforced insulating member, whereby to secure said first and second end members to said cylindrical resin-bonded glass-fibre-reinforced insulating member in a manner to withstand the tension stress imposed thereon.

2. Gas-blast electric switchgear comprising first and second end members, an elongated hollow circular-section porcelain insulating member between said first and second end members, whereby to space said first and second end members apart, a cylindrical resin-bonded glass-fibre-reinforced insulating member concentrically within said elongated hollow circular-section porcelain insulating member and interconnecting said first and second end members in tension, whereby said elongated hollow circular-section porcelain insulating member is placed in compression, said elongated hollow circular-section porcelain insulating member and said cylindrical resin-bonded glass-fibre-reinforced insulating member defining a circular annular space therebetween, a pair of cooperating interrupter contact members within said cylindrical resin-bonded glass-fibre-reinforced insulating member, means to supply gas under high pressure to within said cylindrical resin-bonded glass-fibre-reinforced insulating member, said circular annular space being at a relatively low pressure, whereby the major part of the pressure difference between said high pressure and atmosphere occurs across said cylindrical resin-bonded glass-fibre-reinforced insulating member, and a liner of inorganic heat-resisting insulating material secured within the cylindrical resin-bonded glass-fibre-reinforced insulating member and surrounding the cooperating interrupter contact members, whereby to protect said resin-bonded glass-fibre-reinforced insulating member from the effects of an arc drawn between said contact members on operation of the circuit-breaker, each of said first and second end members having secured within it a metal end ring screwed and bonded to the respective end of said cylindrical resin-bonded glass-fibre-reinforced insulating member, whereby to secure said first and second end members to said cylindrical resin-bonded glass-fibre-reinforced insulating member in a manner to withstand the tension stress imposed thereon.

References Cited by the Examiner
UNITED STATES PATENTS

| | | | |
|---|---|---|---|
| 2,447,674 | 8/1948 | Strom et al. | 200—148 |
| 2,454,586 | 11/1948 | Amer | 200—148 |
| 2,662,133 | 12/1953 | Burmeister | 174—30 |
| 2,669,629 | 2/1954 | MacNeill et al. | 200—150 |
| 2,691,085 | 10/1954 | Beatty | 200—148 |
| 2,804,576 | 8/1957 | Coggeshall et al. | |
| 2,965,736 | 12/1960 | Brown | 200—145 X |

FOREIGN PATENTS

| | | |
|---|---|---|
| 1,040,850 | 5/1953 | France. |
| 736,231 | 9/1955 | Great Britain. |

KATHLEEN H. CLAFFY, *Primary Examiner.*

BERNARD A. GILHEANY, *Examiner.*